INVENTOR
ROBERT P. FLETCHER
BY Robert W. Berray
ATTORNEY

United States Patent Office 3,444,526
Patented May 13, 1969

3,444,526

STORAGE SYSTEM USING A STORAGE DEVICE HAVING DEFECTIVE STORAGE LOCATIONS

Robert P. Fletcher, Poughkeepsie, N.Y., assignor to International Business Machines Corporation, Armonk, N.Y., a corporation of New York Filed June 8, 1966, Ser. No. 556,098
Int. Cl. G06f 7/24
U.S. Cl. 340—172.5 4 Claims

ABSTRACT OF THE DISCLOSURE

Logic is disclosed in the accessing mechanism of a storage device which permits the use of a storage device having defective data word locations. Normal transfer of data to or from the storage device includes a block of data consisting of a predetermined number of data words or locations in the storage device. When a block of data is accessed in the main storage device, sequential data word locations are accessed and transferred. Transfer continues within the main storage device block with means for detecting the presence of defective word locations. Transfer continues through the main block of the storage device until the last data word location within a particular storage block is reached at which time the logic provided transfers the accessing of data word locations from the main storage block to an associated overflow storage block within the storage device to complete the transfer of the predetermined number of data words within the data block.

This invention relates to a data processing system storage organization and more particularly to a storage system capable of reliable operation even though certain of the storage locations are defective and incapable of storing valid data.

The subject invention finds use in storage systems which can be either mechanical or electronic and which are operated in a block mode. Data transfer between the storage system and a using system will be based on an address applied by the using system which identifies one or more of a plurality of equal size blocks in the storage system, wherein each block is comprised of a predetermined number of storage locations. It is a specific purpose of the invention to permit use of the above-identified storage system even though certain of the storage locations in the system may be comprised of defective storage devices whereby valid data cannot be stored in certain of the storage locations.

The bad individual storage devices or bad bits can be the result of imperfect manufacturing, which are discovered during manufacturing tests, or can be caused by dynamic failures, which are discovered during operation. In the first case, usable yield will be improved. The ability to use imperfect memories will be especially important in the case of "batch" processed memories where a large capacity array is manufactured in a single step, but a few bad bits usually result and thus require scrapping of the entire array. The ability to use these imperfect arrays will greatly reduce the cost per bit, and enhance the feasibility of large bulk storage.

In the second case, storage bits can fail but the memory and the system can continue. Effectively, bad storage locations are configured out of the storage system and operation continues with the remaining number of good storage locations. This is an advantage over present methods of operation where one or two bad bits make the entire memory unavailable to the system.

It is an object of the present invention to provide a storage system which is capable of reliable operation even though it contains defective components.

It is a further object of this invention to provide a storage system capable of automatically accounting for defective storage locations.

It is a further object of this invention to provide a storage system in which defective storage locations may be accounted for with or without program control.

Still another object of the present invention is to provide a simple, reliable and inexpensive system of compensating for defective storage components wherein the means of compensation need not be comprised of perfect components.

These and other objects, features and advantages are realized in a preferred embodiment of the invention which includes a storage system comprised of a plurality of main storage blocks, each block having a predetermined number of data word storage locations. Access to the storage system is provided by addressing means which receives a block address from a using system, and further contains means by which all of the storage locations within an addressed block can be accessed. As each storage location is accessed and read out from the storage location into a storage data register, means are provided for detecting whether or not the storage location is capable of storing valid data. Prior to the start of data transfer between the storage system and the using system, counting means are set to a value indicating the number of storage locations to be transferred between the using system and the storage system. As each storage location is accessed, the storage location address is stepped to provide access to the next location, and for each valid location accessed, the word count is modified. When the detection means at the output of the storage system detects the access of a defective storage location, the word counting means is not stepped. The possibility exists that the word counting means will not have been stepped to zero although the accessing means has stepped through all locations in the block.

In the preferred embodiment of the invention, the storage system is further comprised of storage locations in an overflow section of the storage system. Each main storage block in the storage system will have an associated overflow storage block comprised of a plurality of storage locations. Statistics can dictate the number of storage locations needed in the overflow storage blocks. The overflow storage blocks may be manufactured by the same manufacturing process and may contain defective locations. The size of the overflow storage blocks must be such to insure that the number of good locations in the main block and overflow block combined total the predetermined number of locations in a complete block transfer. When the last storage location in a main storage block is accessed, and the word counting means indicates that further transfers are required to complete a block transfer, the addressing means is modified to cause access to an associated overflow storage block to complete the transfer of the predetermined number of storage locations in a storage block. When the predetermined number of transfers has been completed from the overflow storage block, the addressing means will provide a new main storage block address and transfer will then continue from the main storage locations.

The foregoing and other objects, features and advantages of the invention will be apparent from the following more particular description of the preferred embodiment of the invention, as illustrated in the accompanying drawings.

Figure 1:
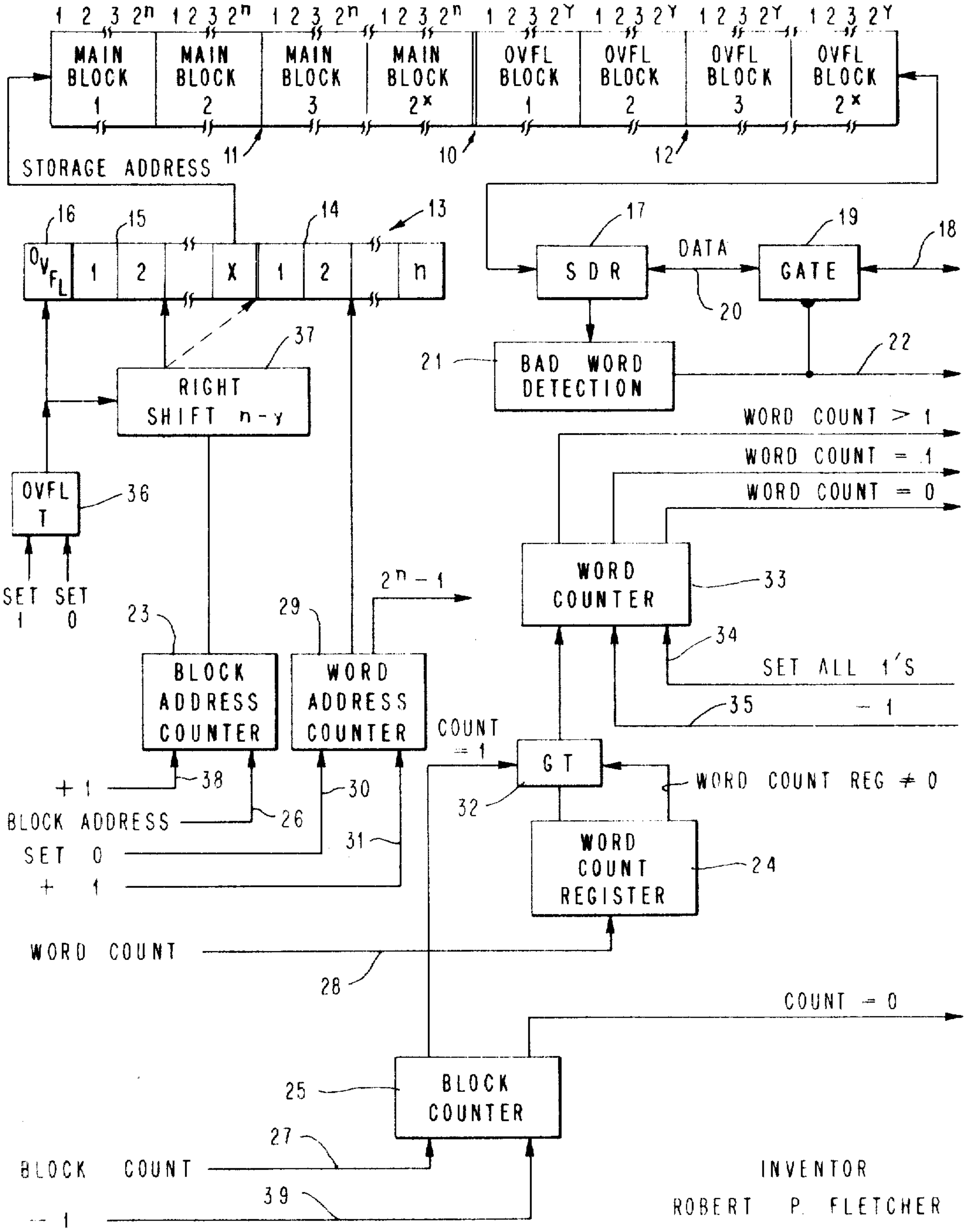
FIGURE 1 is an over-all information flow block diagram of the storage system.

FIGURE 1 shows the major functional units of a storage system for practicing the present invention. There is shown a storage system 10 which is comprised of a plurality of main blocks of data labeled MAIN BLOCK 1 through MAIN BLOCK $2^x$ in the main storage section 11. Each of the main blocks is comprised of a predetermined number of storage locations designated 1 through $2^n$. As a part of the storage system 10, there is also provided a section 12 comprised of $2^x$ overflow blocks (OVFL 1 through OVFL$2^x$), each associated with one of the main blocks. Each of the overflow blocks is comprised of a predetermined number of storage locations 1 through $2^y$. In manufacture, the number of storage locations in each of the main blocks can be predetermined by the needs of the using system. The number of storage locations to be included in each of the overflow blocks can be determined by statistical experience which indicates the number of overflow storage locations which must be provided to insure that the number of valid storage locations in a main block plus the valid locations in an associated overflow block will at least equal the predetermined size of each block, namely 1 through $2^n$ storage locations.

As a part of the storage system, there is provided a storage address register 13. The storage address register 13 in the present invention is comprised of a section 14 of binary bits numbered 1 through *n* and a section of binary bits 15 numbered 1 through *x*, and a single binary bit 16 (OVFL) for providing access to the overflow section of the storage device 10. The address bits in section 15 provide access to a particular one of the $2^x$ main blocks; the address bits in section 14 provide access to any of the $2^n$ storage locations in a particular main block. The binary bits in position 16 of the address register 13 provides access to those blocks and storage locations in the overflow section 12 of the storage device 10. Also provided in the present invention, and in prior art storage systems, is a storage data register 17 (SDR) which temporarily retains data for storage in, or read from the storage device 10. The storage data register 17 receives a number of binary bits equal to the bit size of each of the storage locations in the storage system 10. The normal transfer of data between the storage system 10 and a using device is via Cable 18, Gates 19, and Cable 20.

As a part of the present invention, means are provided for detecting access to storage locations which are incapable of storing valid data by reason of the storage location containing defective storage elements. The invalid storage locations are detected by a Bad Word Detection means 21 which is responsive to the contents of the storage data register 17. Storage data register 17, will invariably receive the contents of each accessed storage location whether data is to be written into the storage location or to be read from the storage location. It is common practice in storage systems of the destructive read out type that first a read out and destruction of the contents of the storage location will occur followed by a regeneration of the data if transfer is to be to the using system. If transfer is from the using system, the destroyed data will not be regenerated, but rather the new data will be written into the previously destroyed location. Whether reading from or writing into the storage device, storage data register 17 will receive the contents of each accessed storage location and signal, through the bad word detection 21, whether or not the storage location can contain valid data.

The means by which the bad word detection 21 provides a bad location signal on line 22 can be any of a number of ways. In one form, the storage device 10 can be manufactured in such a way that each of the plural bit storage locations will have an additional bit position, or tag position, which can be set to binary 0 or binary 1 to indicate that the storage location is operative or defective, respectively. Detection by the bad word detection 21 of a binary 1 in the tag bit position of an accessed storage location will provide an output signal 22. The bad location signal 22 will be effective at Gates 19 to inhibit the transfer of data between the storage data register 17 and the using system. The bad location signal 22 will also be effective on other functional units to be discussed subsequently.

Also shown in FIGURE 1 are functional units which receive information from the using system in the form of a data transfer instruction. These functional units include a block address counter 23, a word count register 24, and a block counter 25. The block address counter 23 receives data on lines 26 indicative of the address of the main block in the storage device 10 which is to be accessed for data transfer. The block counter 25 receives data on lines 27 indicative of the number of main storage blocks to be transferred during the transfer operation. The word count register 24 receives data from the transfer instruction on lones 28 indicative of the number of storage locations to be accessed in the last main storage block to be transferred. If $2^n$ storage locations are to be transferred from the last block to be transferred, word count register 24 will receive a value of 0.

Also associated with the addressing means, is a word address counter 29. The word address counter 29 receives a signal on a line 30 which sets it to a value of 0 at the start of each block transfer. Another line 31 at the input of the word address counter 29 causes the word address counter to be modified by one to step from storage locations 1 through $2^n$ in the block addressed by block address counter 23.

Transfer counting means are depicted in FIGURE 1 and include gating means 32 and a word counter 33. The word counter 33 has an input 34 operative to set the word counter 33 to a value of all binary 1's and another input on a line 35 by which the value in the word counter 33 is decremented by 1. The word counter 33 has the capacity to count down to 0 from a maximum of $2^n$ as represented by the all 1's setting. To be more fully described in accordance with a particular transfer problem, the word counter 33 is set to all 1's whenever an entire data block is to be transferred. The gate 32 will be energized to transfer the contents of the word count register 24 to the word counter 33 only when the last block of data is to be transferred, signalled by a count equal 1 signal from the block counter 25, and the word count register 24 signals a word count value other than 0. In other words, if less than $2^n$ storage locations are to be transferred from the last block, the contents of the word count register 24 will be transferred to the word counter 33. Otherwise, word counter 33 will be set to all 1's indicating that the block transfer is to include $2^n$ locations.

The remaining structure in FIGURE 1 is to be further identified includes an overflow trigger 36 (OVFL T) and a Right Shift *n—y* gating means 37. The overflow trigger 36 will be set to binary 1 or to binary 0, to thereby set the overflow bit 16 in the storage address register 13 to binary 0 or binary 1, dependent upon whether or not a storage location in the main block area 11 or a storage location in the overflow area 12 is to be accessed in the storage system 10. When the overflow trigger 36 is set to binary 0, indicating transfers from the main block area 11 of the storage device 10, the *x* address bits in the block address counter 23 will be transferred straight through the right shifting means 37 to the address bits 1 through *x* in section 15 of the storage address register 13. Setting of the overflow trigger 36 to binary 1, indicating access to the overflow area 12 of storage system 10, is effective to cause the block address bits to be shifted right in the storage address register 13 a number of bit positions equal to $n-y$. The bit positions vacated by the $x$ address bits in section 15 are set to zero. By causing the block address to be shifted right $n-y$ positions, the storage locations in the overflow block associated with the addressed main block can be uniquely identified in the overflow area. To permit proper operation of the addressing means in the absence of the $n-y$ shift when bit position 16 is set to binary 1, each of the overflow blocks would have to contain $2^n$ storage locations even though only $2^y$ locations would ever be required to complete a main block transfer of $2^n$ storage locations. The $n-y$ shift permits the construction of overflow area blocks of a size sufficient to accommodate the expected number of defective locations, such size being equal to $2^y$ storage locations.

When more than one block is to be transferred as a result of a single transfer instruction, a line 38 is provided to increment the block address counter 23, and a line 39 is provided to decrement the block counter 25. Various other signal lines which have not yet been identified, but which enter into logical decisions, have been descriptively identified and will be referred to in subsequent descriptions concerning FIGURES 2 and 3.

Figure 2:
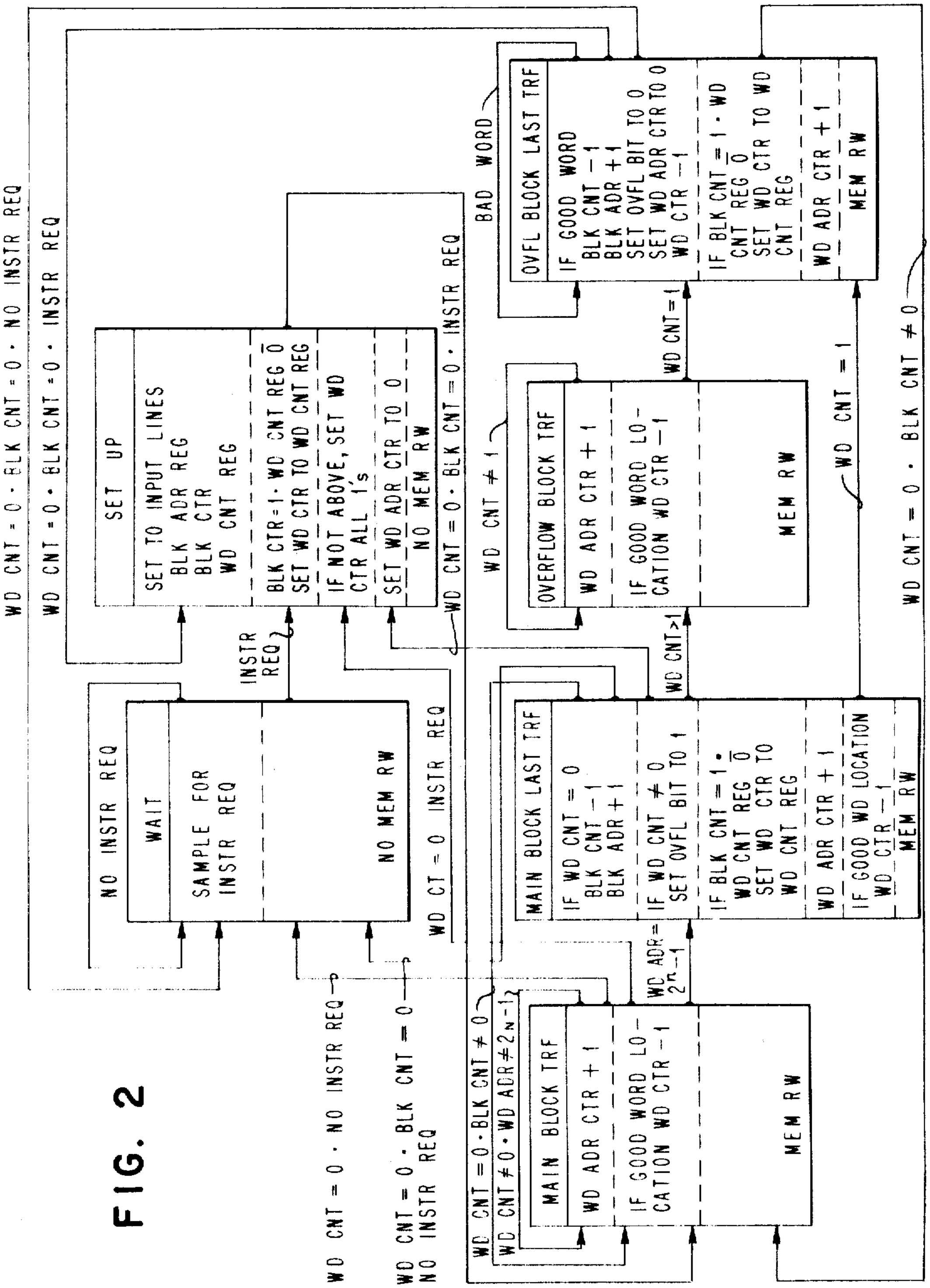
FIGURE 2 is a block diagram depicting the flow of control decisions exercised in accordance with the present invention.

FIGURE 2 will be utilized to explain the various logical decisions which must be made during the entry of values into the various counters, and the transfer of data from main blocks or overflow blocks during a data transfer instruction execution. Details of the logic have not been shown, however, descriptive matter in FIGURE 2 should readily make apparent the required logic, such that a person skilled in the art can interconnect the various signal lines shown in FIGURE 1 to achieve the logic and operation depicted in FIGURE 2. Further, details of the various counters and registers and gates between the counters and registers have not been shown in that these are easily implemented functional units.

In FIGURE 2, there are shown six interconnected function blocks which comprise the control functions and logical functions which must be realized to accomplish data transfer between the storage system 10 and a using system. The first block labeled WAIT is utilized to sample for the presence of an instruction request from the using system. There will be no memory read or write cycles performed during the WAIT status. As soon as the using system issues an instruction request, logic will be utilized to transfer the storage system to the block labeled SET-UP. At this time, a data transfer instruction will have been requested and the contents of the instruction will enter a value into the block address counter 23, the block counter 25, and the word count register 24 of FIGURE 1. As mentioned previously, the contents of the block address counter 23 will specify the first main block to be utilized in the transfer, the block counter 25 will specify the number of blocks to be transferred, and the word count register 24 will receive a value equal to the number of storage locations to be transferred from the last block. If the last block is to transfer $2^n$ storage locations, the word count register 24 will be set to 0.

In the SET-UP status, the block counter 25 and word count register 24 are sampled to determine whether or not a single block is to be transferred, and if only a portion of the block is to be transferred. If such is the case, the word counter 33 will be set to equal the value in the word count register 24. Otherwise, the word counter 33 will be set to all 1's. The word address counter 29 will be set to all 0's to provide access to the first location in the addressed block as specified in the block address counter 23. There will be no memory read or write cycles taken during the SET-UP status.

At this point, the system will transfer to the block labeled MAIN BLOCK TRANSFER. During the transfer of storage locations from a main block, the word address counter 29 will be incremented for each storage location access. Dependent upon the signal or output of the bad word detection 21 of FIGURE 1, the word counter 33 will be decremented by 1 only when a good storage location is accessed by the word address counter 29. The word counter 33 will not be decremented by 1 whenever a storage location is read out which contains the tag bit set to indicate that the storage location is incapable of storing valid data. The MAIN BLOCK TRANSFER status will be maintained, the word address counter 29 incremented, and the word counter 33 decremented for good word locations as long as the word count is not equal to 0 and the word address does not equal $2^n-1$. Read-write cycles will be taken for each new word address. If the word counter 33 should go to 0 when in the MAIN BLOCK TRANSFER status, indicating completion of a data transfer, the status of the system will transfer to the WAIT status or the SET-UP status dependent upon whether or not an instruction request from the using system is present.

Operation in the MAIN BLOCK TRANSFER status continues until the word address counter 29 signals that the next to the last storage location in the block is being accessed ($2^n-1$). At this time, the status of the system transfers to the block labeled MAIN BLOCK LAST TRANSFER. During the MAIN BLOCK LAST TRANSFER cycle, several decisions are made. The word address counter 29 will be incremented after access to the last storage location and will now contain all 0's. The word counter will be decremented only if the last storage location is good. If the word count is decremented to a value of 0 during access of the last storage location in the block, the block counter 25 will be decremented by 1 and the block address counter 23 will be incremented by 1. This situation arises when the entire block has been accessed without encountering any bad storage locations. If the word count equals 0 and the block count equals 0, indicating completion of all transfers for the issued transfer instruction, transfer will be taken to the WAIT status or the SET-UP status dependent upon whether or not another instruction request has been issued by the using system. If the word count equals 0 and the block count does not equal 0, the present transfer instruction requires additional block transfers and a transfer to the MAIN BLOCK TRANSFER status will be taken. If the block counter 25 has been decremented to a count of 1 indicating the start of transfer from the last block, the word count register 24 must be examined for a value other than 0. If the word count register 24 does not equal zero, transfer to the MAIN BLOCK TRANSFER status will be accompanied by a transfer through Gate 32 of the word count register 24 contents to the word counter 33. If the word count register has a value of 0, this indicates that the last block is to be a full block transfer and the word counter 33 will be set to all 1's.

At the completion of the single cycle of MAIN BLOCK LAST TRANSFER the word counter 33 contents are sampled and if it has a value other than 0, the overflow bit position 16 in the address register 13 will be set to provide access to the overflow storage area 12 of the storage device 10. Also, the right shift $n-y$ means 37 will be rendered effective to shift the block address bits 1 through $x$ to the right to provide access to the associated overflow block in the area 12 of the storage device 10. When transferring out of the MAIN BLOCK LAST TRANSFER status to the overflow area, a decision must be made based on the word count value as to whether or not the count is greater than 1 or equal to 1. If the word counter 33 indicates a value greater than 1 indicating that a plurality of storage locations must be accessed in the overflow area, transfer will be taken to the OVERFLOW BLOCK TRANSFER status. The word address counter 29 was incremented by 1 during the MAIN BLOCK LAST TRANSFER status such that it now has a value of 0 and the first storage location in the accessed overflow block will be accessed. For each OVERFLOW BLOCK TRANSFER cycle, the word address counter 29 will be incremented by 1 to provide access to all of the storage locations in the overflow block. For each good word location accessed, as identified by the bad word detection 21, the word counter 33 will be decremented by 1. As long as the word count in word counter 33 is not equal to 1, OVERFLOW BLOCK TRANSFER cycles will be taken. When the word counter 33 equals 1, transfer will be taken to the OVERFLOW BLOCK LAST TRANSFER status. During this status, the last storage location to be transferred will be accessed. As indicated in FIGURE 2, OVERFLOW BLOCK LAST TRANSFER status can be entered either from the OVERFLOW BLOCK TRANSFER status or the MAIN BLOCK LAST TRANSFER status. If the word counter 33 equals 1 when the MAIN BLOCK LAST TRANSFER status is to be transferred from, indicating a need for access to only 1 storage location from the overflow block, transfer will be directly to the OVERFLOW BLOCK LAST TRANSFER cycle.

While in the OVERFLOW BLOCK LAST TRANSFER status, the word address counter will be incremented by 1 providing access to sequential storage locations in the overflow block until the first good word location has been accessed. As soon as the good word location has been accessed during the OVERFLOW BLOCK LAST TRANSFER status, the word counter 33 will be decremented to 0, the block counter 25 will be decremented by 1, the block address counter 23 will be incremented by 1, and the overflow bit position 16 in the storage address register 13 will be set to 0. The contents of the word address counter 29 will be unknown such that at this time the word address counter 29 will also be set to 0. The transfer of a good location during the OVERFLOW BLOCK LAST TIANSFER causes the word count to reach 0 indicating that the specified number of locations in the last addressed block have been transferred.

During the OVERFLOW BLOCK LAST TRANSFER status, the block counter 25 is examined for a value of 1 or 0. If the block count shows a value of 0, the previous transfer instruction has been completed and the decision must then be made to transfer to the WAIT status or to the SET-UP status dependent upon whether or not an instruction request from the using system is present. If the block counter 25 does not equal 0 at the time the word count goes to 0, transfer will be taken to the MAIN BLOCK TRANSFER status. This indicates that additional blocks of transfer are required for the previously issued transfer instruction. At the time of the transfer to the MAIN BLOCK TRANSFER status, the block counter 25 is examined for a value of 1 indicating that the MAIN BLOCK TRANSFER status will be for the transfer of the last block. The word count register 24 will be examined for a value other than 0. With the block count equal 1 and the word count register not equal 0, the contents of the word count register 24 will be transferred to the word counter 33 providing the indication of the number of storage locations to be accessed in the last block to be transferred. If the word count register 24 indicates a value of 0, indicating that a full block is to be transferred, the word counter 33 will be set to all 1's.

Figure 3:
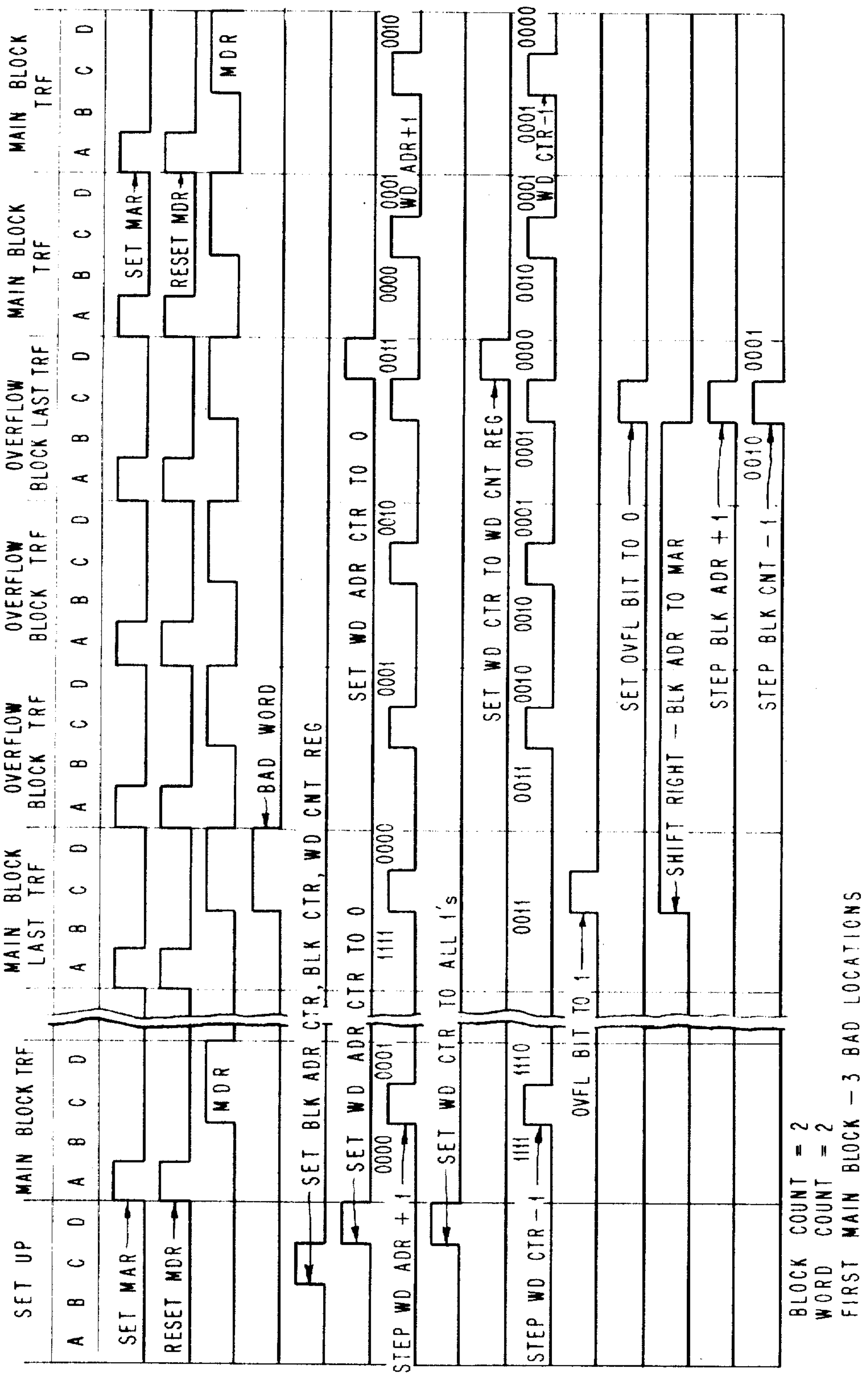
FIGURE 3 is a timing diagram showing various controls performed in accordance with FIGURE 2 for a particular data transfer problem.

FIGURE 3 shows a timing diagram for a specific data transfer instruction which has designated that two blocks of data are to be transferred, wherein only two storage locations are to be transferred from the last block. Also depicted is a situation wherein three bad locations are encountered in the first main block requiring three accesses to an associated overflow block. During the SET-UP cycle, the block address counter 23 is set to the block address, the block counter 25 is set to 2 and the word count register 24 is set to 2. The word address counter 29 is set to 0. Because the block counter 25 is not equal to 1, the word counter 33 is set to all 1's (full logic block). The next cycle is a MAIN BLOCK TRANSFER cycle (FIGURE 2).

MAIN BLOCK TRANSFER cycles are executed until the last word location in the main block is reached. Up to this time, two bad word locations have been detected and skipped, the third bad word location is assumed to be in the last word location of this main block. A MAIN BLOCK LAST TRANSFER cycle is executed at the last word location in the main block. Going into this cycle, the word count is 3. A bad word is detected in this cycle, therefore, the word count remains at 3. Because the word count is greater than 1, the next cycle is an OVERFLOW BLOCK TRANSFER cycle.

The word address counter 29 will be stepped +1 to 0. In the overflow block, the word address counter 29 is needed only for generating a maximum of $2^y$ word addresses because operation in the overflow block is always terminated by the word count reaching 0. It is for this reason, that the block address can be shifted right $n-y$ positions.

Two OVERFLOW BLOCK TRANSFER cycles are executed, transferring two of the remaining three words and stepping the word counter 33 to 1. The word count of 1 causes the next cycle to be an OVERFLOW BLOCK LAST TRANSFER cycle. A single OVERFLOW BLOCK LAST TRANSFER cycle is executed which transfers the last word of the logic block. During this OVERFLOW BLOCK LAST TRANSFER cycle, the block address counter 23 is stepped +1 and the block counter 25 is stepped from 2 to 1. The word count register 24 has been storing a word count of 2 since the beginning of the instruction. Therefore, at the end of this cycle, a block count equal 1 and word count register not equal to 0 causes the contents of the word count register 24 to be set into the word counter 33. Because the block counter 25 is not equal to 0, the next cycle will be a MAIN BLOCK TRANSFER CYCLE.

Two MAIN BLOCK TRANSFER cycles are executed, transferring the two words of the logic block. During the second cycle, the word counter 33 reaches 0 and ends this instruction. The next cycle will be either a WAIT or a SET-UP cycle depending on whether or not there is another instruction request.

There has thus been shown, a data storage system wherein defective storage locations in the storage system do not prevent its use. Operation of the storage system with defective locations can be accomplished by providing additional overflow storage areas wherein the completion of the transfer of a predetermined number of locations can be completed in the overflow area whenever defective locations are encountered in the main storage area. The above can be accomplished without operator or program intervention in that hardware logic can be provided for accomplishing the result. A preferred embodiment of the invention has been shown with reference to core storage, however the storage device could just as well be magnetic tape, drums, disks, or any other storage device which is to be operated on a block transfer basis.

The previously described embodiment can be used in a system where tag bits are inserted at the time of testing during manufacture, or by means of a program when the storage locations fail during use. Another form of bad location detection can be designed to eliminate the need for a tag bit position. Many systems use parity for error detection wherein a requirement can be made that there be at least one binary 1 in each word accessed. Bad location detection could be accomplished by forcing bad locations to store all binary 0's in the location. Certain other storage devices might dictate the storage of all binary 1's.

The described embodiment shows the bad location tag being associated with the location that is bad. It is apparent that various periods of time between the transfer of data to the using system may be encountered. By placing certain restrictions on the storage system, and by making a slight modification to the word address counter 29, the period between transfers can be made uniform. If the first location in each block is good, and there are never two adjacent bad locations, the tag bit can be made to indicate that the next following location is bad. By adding a +2 increment to the word address counter 29, the bad location can be skipped over and never accessed. The using system will not have to wait for access to each good location. Two tag bits, with no 4 adjacent bad locations, and incrementing of the address counter 29 by 1, 2, 3 or 4, provides the same constant data rate.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A storage system for transferring data between a using device and a data store including addressable main storage blocks of data, each main storage block having a predetermined number of addressable data word locations, comprising in combination:

addressing means, including main storage block addressing means and word address counting means for sequentially accessing word locations in sequential main storage blocks for the transfer of data;

transfer counting means, including word counting means and setting means connected to said word counting means to set said word counting means to a value indicative of the number of word locations to be transferred from an addressed one of the main storage blocks, said transfer counting means normally adapted to modify said word counting means for each access to an addressed location;

overflow storage blocks of sequentially addressable data word locations, each overflow block being associated with a particular main storage block of data;

detection means, responsive to read-out signals from each accessed storage location, for providing a bad location signal to said word counting means indicating that a storage location is incapable of storing valid data, and effective to inhibit modification of said word counting means;

and overflow block accessing means connected to said addressing means, connected and responsive to said word address counting means and said word counting means, for addressing the one of said overflow storage blocks associated with the addressed main storage block for completing the transfer of data from said associated overflow storage block when the last location of the addressed main storage block is to be addressed and said word counting means has not been modified the number of times indicated by said setting means.

2. A storage system in accordance with claim 1 wherein said addressing means further includes:

an address register comprised of $x$ block addressing bits connected and responsive to said main storage block addressing means, $n$ data word addressing bits connected and responsive to said word address counting means, and one overflow storage address bit normally set to provide access to main storage blocks, said address register being effective to access any storage location including said overflow storage blocks;

and wherein said overflow block accessing means includes, overflow signalling means connected to said address register overflow address bit operative to change said bit to provide access to said overflow storage block associated with the main storage block indicated by said $x$ block address bits.

3. A storage system in accordance with claim 2 wherein:

said overflow storage blocks is each comprised of $2^y$ storage locations, $y$ being less than $n$; and said addressing means further includes, shift means, responsive to said overflow signalling means, operative to shift said $x$ block addressing bits $n-y$ positions to the right in said address register thereby providing a total addressing capability for all locations in all of said overflow blocks equal to $2^x$ times $2^y$.

4. A storage system in accordance with claim 1 further including:

main storage block counting means settable to indicate the number of blocks to be transferred and operative to be modified prior to each block transfer and provide a count of 1 signal during transfer from the last block to be transferred;

and wherein said setting means further includes, word count register means for receiving, manifesting and transferring a word count indicative of the number of locations to be transferred from the last block of data to be transferred;

said setting means connected to said word counting means normally effective at the beginning of each block transfer to set said word counting means to indicate the predetermined number of words in each block, and connected and responsive to said count of 1 signal from said block counting means and a manifestation in said word count register not equal to zero for transferring the contents of said word count register to said word counting means.

References Cited

UNITED STATES PATENTS

| | | | |
|---|---|---|---|
| 3,222,653 | 12/1965 | Rice | 340—172.5 |
| 3,245,049 | 4/1966 | Sakalay | 340—172.5 |
| 3,331,058 | 7/1967 | Perkins | 340—172.5 |
| 3,350,690 | 10/1967 | Rice | 340—172.5 |

ROBERT C. BAILEY, *Primary Examiner.*

HARVEY E. SPRINGBORN, *Assistant Examiner.*